June 10, 1947.  H. O. HEM  2,422,167
INTEGRATING WEIGHING SCALE
Filed July 9, 1943  4 Sheets-Sheet 3
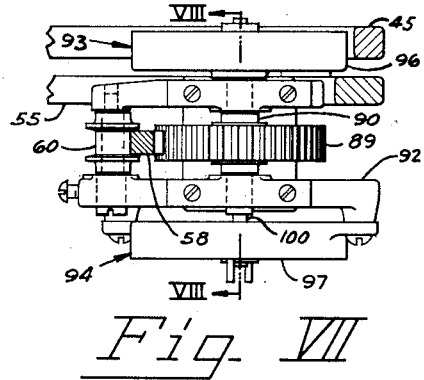
Fig. VII
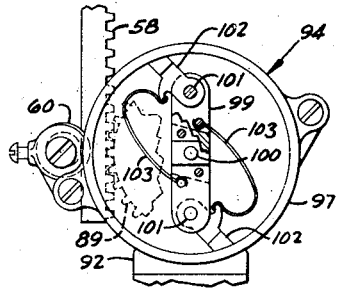
Fig. IX
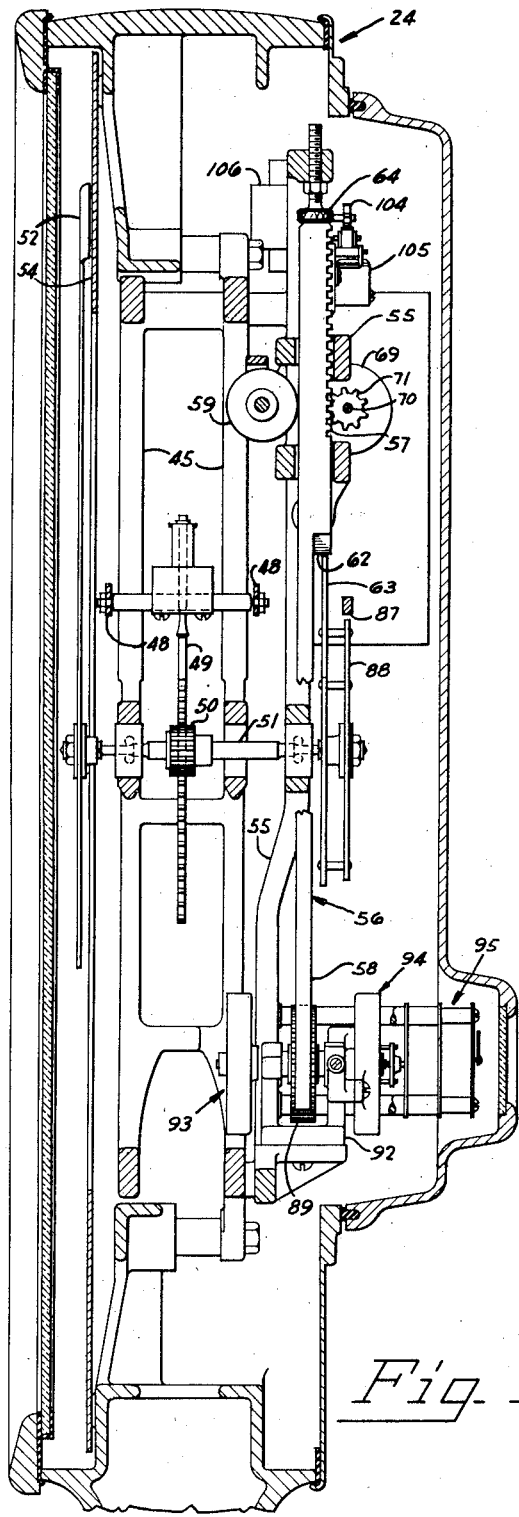
Fig. VI
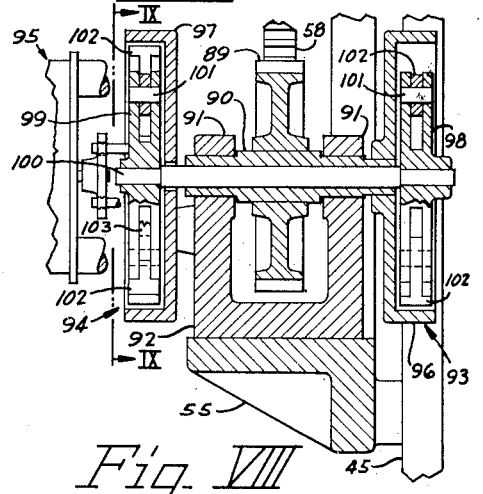
Fig. VIII
INVENTOR.
Halvor O. Hem
BY
Marshall & Marshall
ATTORNEYS

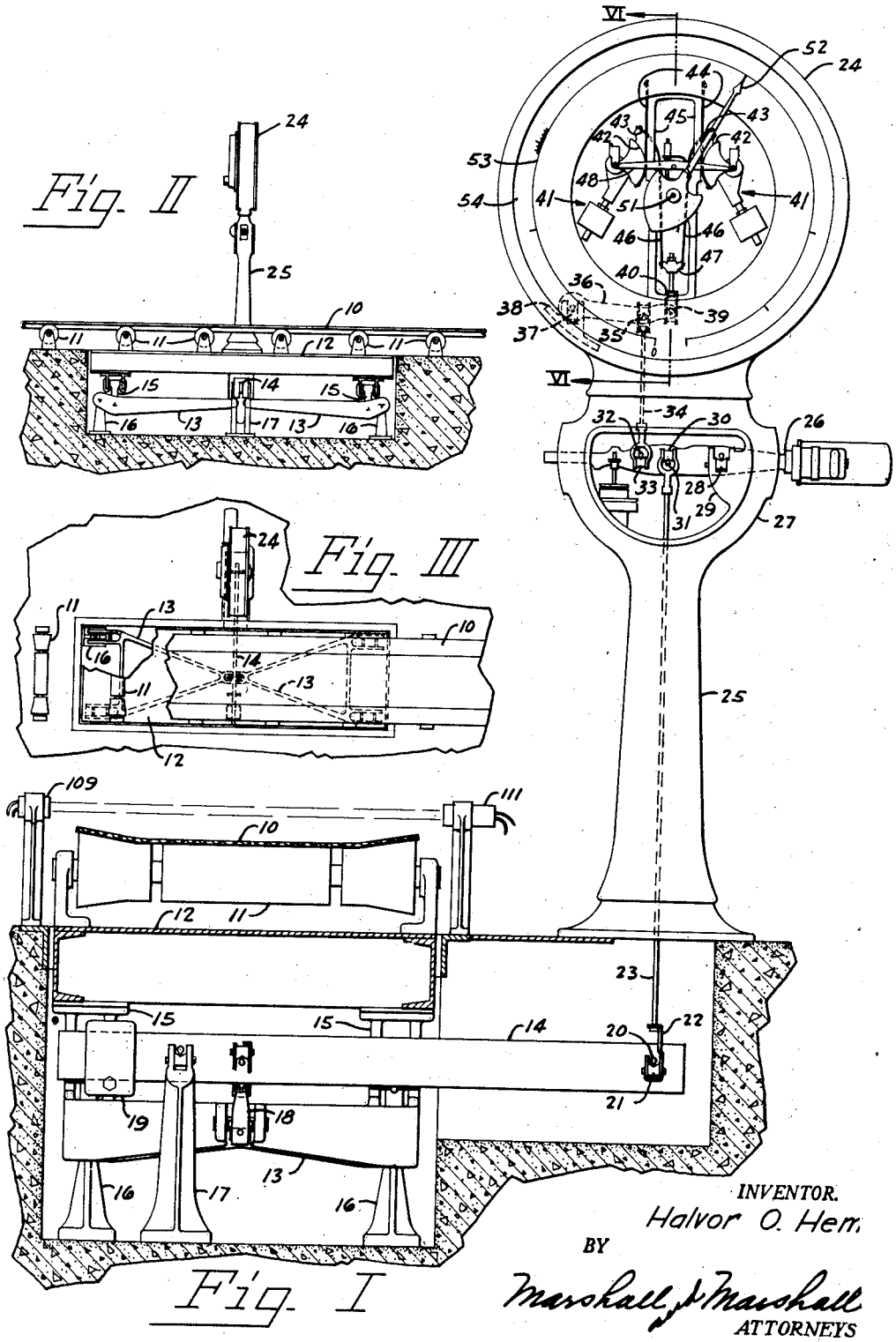

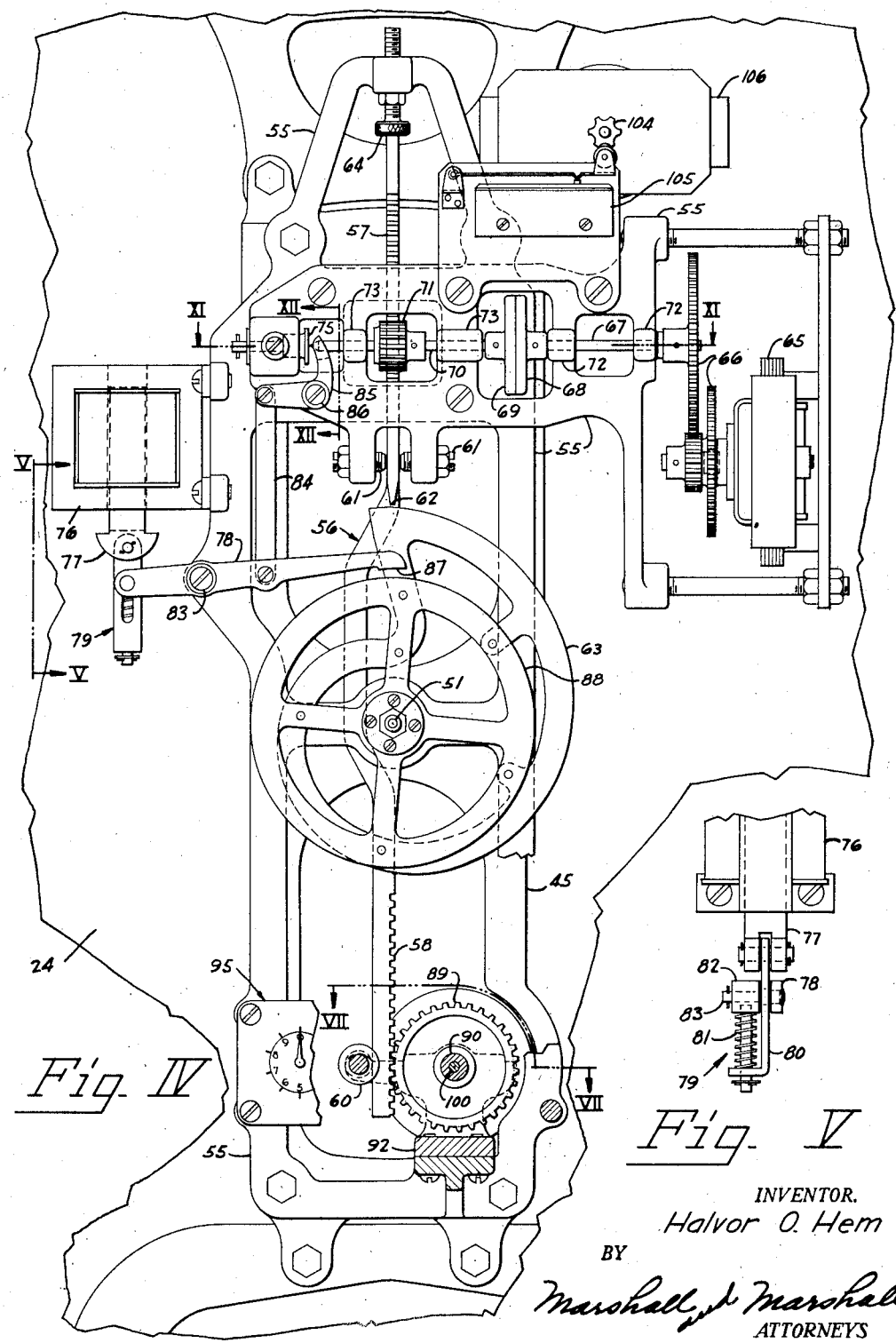

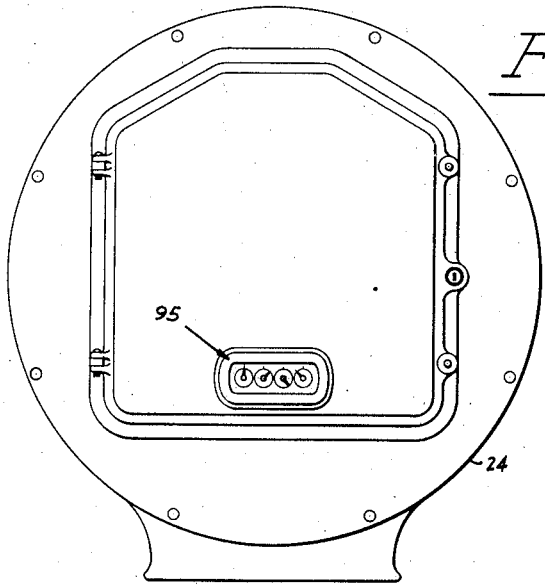
*Fig. X*
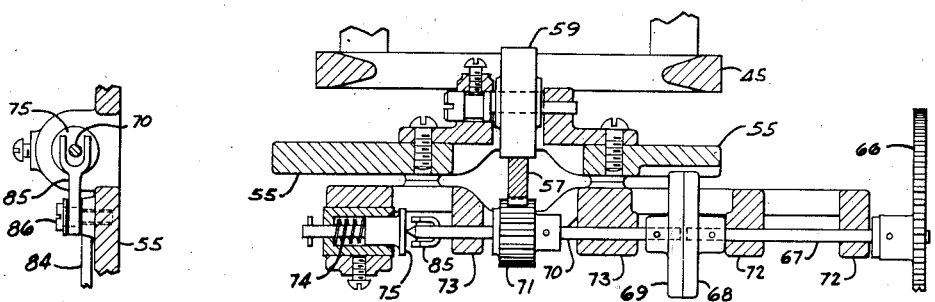
*Fig. XII*    *Fig. XI*
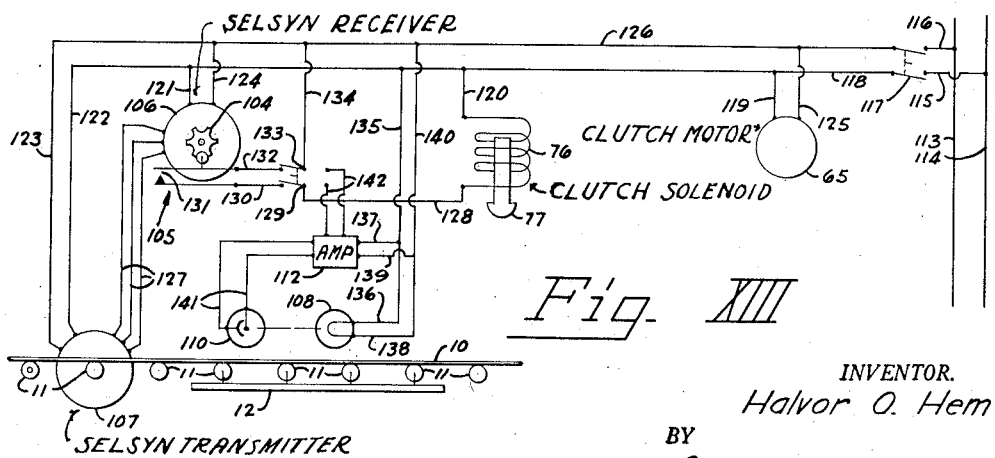
*Fig. XIII*
INVENTOR.
Halvor O. Hem
BY
Marshall & Marshall
ATTORNEYS Patented June 10, 1947

2,422,167

UNITED STATES PATENT OFFICE 2,422,167

INTEGRATING WEIGHING SCALE

Halvor O. Hem, Toledo, Ohio, assignor to Toledo Scale Company, Toledo, Ohio, a corporation of New Jersey Application July 9, 1943, Serial No. 494,001

3 Claims. (Cl. 265—28)

The invention relates to weighing scales, and in particular to scales adapted to indicate the accumulated total of a number of loads passed over the scale.

It is often desirable to know the quantity of material passing over a conveyor in a given period of time. While it is quite simple to provide a scale to weigh a portion of a conveyor and indicate the weight of the material on that portion of the conveyor, before one can determine the amount of material conveyed the weight of each small section of conveyor must be read and the result computed. It is desirable also that as many readings as possible be taken, particularly when the conveyor is irregularly loaded. In other applications when the material to be conveyed and weighed consists of discrete items, it is preferable to take a weight reading of each item rather than each portion of the conveyor. In those cases one reading for each container is sufficient.

The object of this invention is to provide a scale with mechanism to total the weights of successive increments of conveyor length to give a measure of the quantity of material passed over the scale.

Another object is to provide mechanism to indicate the total weight of a series of loads weighed on a scale.

A further object is to provide mechanism to indicate the sum of a number of indications of a condition responsive device.

In the embodiment of the invention shown these objects are attained by employing a spiral cam positioned by the indicator to limit the stroke of a reciprocatory slide to a length proportional to the indicated load, reciprocating the slide once for each unit of conveyor length or each load as it is weighed by the scale, and converting the reciprocatory motion of the slide to unidirectional rotary motion which is integrated and indicated by a counter.

This invention is illustrated in the drawings in which:

Fig. I is an end elevational view, partly in section, showing a scale supporting a conveyor roll.

Fig. II is a side elevational view showing the mounting of the conveyor rolls on the scale.

Fig. III is a plan view, parts being broken away, showing the arrangement of the conveyor and lever system of the scale.

Fig. IV is a fragmentary elevational view, parts being shown in section and parts being broken away, of the rear of the indicator housing showing the principal parts of the invention.

Fig. V is a view taken along the line V—V of Fig. IV, showing a portion of the brake applying mechanism.

Fig. VI is a cross sectional view of the indicating and integrating mechanism taken substantially along the line VI—VI of Fig. I.

Fig. VII is a fragmentary plan view of the overrunning clutch and brake, some parts being shown in section, taken along the line VII—VII of Fig. IV.

Fig. VIII is a cross sectional view of the overrunning clutch and brake taken along the line VIII—VIII of Fig. VII.

Fig. IX is an end view of the overrunning clutch and brake taken along the line IX—IX of Fig. VIII.

Fig. X is a rear view of the indicator housing showing the cover in place and the window for reading the counter.

Fig. XI is a fragmentary plan view of the mechanism driving the slide, supporting parts being shown in cross section, taken along the line XI—XI of Fig. IV.

Fig. XII is an end view of the slide drive release mechanism taken along the line XII—XII of Fig. IV.

Fig. XIII is a schematic wiring diagram showing the electrical circuits incorporated in the device.

These specific drawings and accompanying description disclose a particular embodiment of the invention and are not intended to impose limitations upon the claims.

In a scale incorporating the invention as shown in Figs. I, II, and III a conveyor belt 10 runs on a series of rollers 11 some of which are mounted on a scale platform 12. The scale platform 12 is supported by a lever system comprising main levers 13, an extension lever 14, suitable brackets 15 between the platform 12 and the main levers 13, pedestals 16 supporting the main levers 13, another pedestal 17 supporting the extension lever 14, and connections 18 between the main and extension levers. A portion of the dead weight of the platform and main levers is balanced by a counterweight 19 adjustably mounted on the extension lever 14.

The extension lever 14 is provided with a power pivot 20 adapted to engage and transmit force to a bearing 21 which is pinned in a stirrup 22 suspended from the lower end of a steelyard rod 23.

Load counterbalancing, indicating and totalizing mechanisms are mounted within a substantially watchcase-shaped housing 24 surmounting a hollow column 25.

A lever 26 partially housed within an enlarged section 27 of the hollow column 25 is fulcrumed on bearings 28 mounted in brackets 29 in the interior of the enlarged section 27. The steelyard rod 23 transmitting force from the load-supporting lever system is operatively connected through a bearing and stirrup 30 to a load knife edge 31 on the lever 26. The lever 26 is further provided with a power pivot 32 engaging a bearing 33 in a linkage 34 which extends into the watchcase-shaped housing 24 to transmit force to the load knife edge 35 of a secondary lever 36. Fulcrum bearings 37 mounted on brackets 38 secured to the interior of the rim of the watchcase-shaped housing 24 rockably support the secondary lever 36. A power pivot 39 on the secondary lever 36 cooperates with a bearing in a stirrup 40 to transmit forces from the lever to the load counterbalancing mechanism.

The load counterbalancing mechanism comprises a pair of pendulums 41 each provided with arcuate faces 42 and 43. Steel ribbons 44 attached to the sides and near the top of a substantially rectangular frame 45 and to the smaller arcuate faces 42 serve to support the pendulums 41 and allow them to roll up the sides of the frame 45 under the influence of forces applied to load ribbons 46 overlying the larger arcuate faces 43. A yoke 47 serves to connect the load ribbons 46 to the stirrup 40 thus operatively coupling the counterbalance to the lever system.

Equalizing bars 48 pivotally attached to the pendulums 41 at their effective centers of rotation support a rack 49 (Fig. VI) which, by meshing with a pinion 50 on an indicator shaft 51, serves to convert the vertical motion of the pendulums 41 into a proportional rotary motion of the indicator shaft 51. An indicator 52 attached to the indicator shaft 51 sweeps over a series of indicia 53 on a chart 54 and by cooperating therewith continuously indicates the load on the scale.

The totalizing mechanism is mounted on an auxiliary frame 55 (Figs. IV and VI) bolted to the rear of the pendulum frame 45. A reciprocatory slide member 56 incorporating racks 57 and 58 at its upper and lower ends respectively is guided by rollers 59 and 60 and adjustable screws 61 to reciprocate along a vertical line perpendicular to and intersecting the indicator shaft 51. The central portion of the slide member 56 is offset to pass the indicator shaft 51. Further, the upper portion of the slide member 56 is fitted with an inverted step 62 adapted to engage a spiral cam 63 mounted on and rotating with the indicator shaft 51 to limit the downward travel of the slide 56 in accordance with the load on the scale.

The reciprocatory slide member 56 is normally urged upward against an adjustable stop 64 threaded into the top of the auxiliary frame 55 by an electric motor 65 acting through speed reducing gears 66, a driving shaft 67, a slipping clutch composed of a driving member 68 and a driven member 69, a driven shaft 70 and a pinion 71 meshing with the upper rack portion 57 of the reciprocatory slide 56.

The driving and driven shafts 67 and 70 are journaled in bearings 72 and 73 respectively in the auxiliary frame 55, provision being made to allow axial motion of the driven shaft 70.

The clutch members 68 and 69 are normally held engaged by a spring 74 forcing a thrust bearing 75 against the end of the driven shaft 70.

To provide mechanism to release the clutch by an electrical signal, a solenoid 76 fitted with an armature 77 is attached to the side of the auxiliary frame 55. The armature 77 is connected to a straight lever 78 by a yieldable coupling 79. This coupling consists of an L-shaped link 80 depending from the armature 77, and a compression spring 81 which rests on the shelf of the L-shaped link 80, and pushes against a bearing 82. A pin 83 riveted in the straight lever 78 extends through a slot in the vertical portion of the L-shaped link 80 and the bearing 82. The force of the armature 77 of the solenoid 76 applied to the straight lever 78 is thereby limited to the force exerted by the spring 81 acting between the L-shaped link 80 and the bearing 82. The straight lever 78 pivots on a screw 83 threaded into the auxiliary frame 55 and is connected by a link 84 to one arm of a bell crank lever 85 pivoted on another screw 86. The other arm of the bell crank lever 85 is adapted to retract the thrust bearing 75, thus relieving the pressure between the clutch plates 68 and 69, when the solenoid 76 is energized. When the clutch plates 68 and 69 are so released, the reciprocatory member 56 moves downward under the influence of gravity until the step portion 62 encounters the spiral cam 63 on the indicator shaft 51. Any tendency for the slide member 56 to cause rotation of the spiral cam 63 is counteracted by an extension 87 on the solenoid-actuated straight lever 78, acting as a brake on the rim of a circular disc 88 mounted on the indicator shaft 51.

The rack 58 on the lower end of the reciprocatory slide member 56 meshes with and drives a pinion 89 pressed on a short hollow shaft 90 which is journaled in bearings 91 in a bracket 92. The bracket 92 is attached to the lower portion of the auxiliary frame 55 so that the hollow shaft 90 is horizontal and substantially parallel to the indicator shaft 51. The oscillatory rotary motion of the pinion 89 and hollow shaft 90 resulting from reciprocations of the reciprocatory slide member 56 is converted by an overrunning clutch 93 and a brake 94 to an intermittent unidirectional motion which is registered by a counter mechanism 95 shown generally in Fig. IV and Fig. VI.

The overrunning clutch 93 and the brake 94 are of similar construction. The driving member 96 of the clutch 93 and the brake drum 97 of the brake 94 are cup shaped drums, the former mounted on the hollow shaft 90 and the latter on the support bracket 92. The driven member 98 of the clutch 93 and the brake arm 99 of the brake 94 are relatively narrow bars transversely mounted on the ends of a shaft 100 extending through the hollow shaft 90. Both ends of the driven clutch member 98 and the brake arm 99 are bifurcated and fitted with pins 101 to mount pivotal dogs 102, which by means of springs 103 are caused to bear obliquely against the interior rims of the cup-shaped clutch member 96 and brake drum 97. The oblique engagement of the dogs 102 prevents, by wedging action, any backward relative motion. The arrangement of the parts is such that during the downward stroke of the reciprocatory slide 56 the overrunning clutch 93 slips because the connecting shaft 100 is held stationary by the brake 94, while on the upward stroke the overrunning clutch drives the connecting shaft 100 and the counter 95 coupled thereto.

In operation, each time the solenoid 76 is energized, it acts through the extension of the straight lever 78 to arrest the indicator movement and also through the bell crank lever 85 to release the slipping clutch member 69, allowing the reciprocatory slide member 56 to drop. The downward travel of the slide member 56 is terminated by the spiral cam 63 positioned by the indicator shaft 51 and is thus proportional to the load on the scale. Deenergization of the solenoid 76 reengages the slipping clutch member 69 and the motor 65 then returns the reciprocatory slide member 56 to its normal upper position. The oscillating movement of the reciprocatory slide member 56 transmitted through the rack 58 and pinion 89 is converted to proportional intermittent unidirectional rotation by the overrunning clutch 93 and the brake 94, thus advancing the counter in proportion to the load on the scale.

When a scale equipped with the totalizing mechanism described is used to weigh material transported by a conveyor belt the totalizing mechanism must be operated once for each increment of belt length as it passes the scale. The weight of material is then determined by dividing the totalized indication by the number of increments of belt length carried on the scale. In other words, if three operations of the totalizer occur while one element of the belt is passing the scale, then that element is weighed three times and the total weight of material passed is one third the indicated total.

The device may, of course, be made direct reading by calibration of the totalizer in accordance with the above relationship.

The required operation of solenoid 76 controlling the totalizer action is accomplished by a cam 104 operating a switch 105 connected in series with the solenoid 76. The cam 104 is shown mounted on the shaft of a receiving Selsyn 106 which is electrically connected to and reproduces the motion of a transmitting Selsyn 107 coupled to one of the rollers 11 supporting the conveyor belt 10. In some installations it is preferable to provide a separate pulley running on the belt to drive the Selsyn transmitter 107.

The Selsyn drive may in many cases be replaced by a flexible shaft or the switch 105 may be mounted near the conveyor belt 10 and the cam 104 mounted on one of the conveyor rolls 11 or on a shaft coupled to a pulley running on the belt. In any such arrangement the object of energizing the solenoid in accordance with conveyor belt travel is accomplished.

When the scale equipped with the totalizing mechanism is used to weigh and total a series of objects carried on the conveyor, the cam operated switch 105 may be replaced by a photo electric switch comprising a light source 108 in a lamp house 109, a photo cell 110 in a photo cell housing 111, and an amplifier 112. The lamp house 109 and the photocell housing 111 are so positioned on opposite sides of the conveyor belt 10 that the light beam is interrupted when the object to be weighed is on the scale.

The electrical circuits are shown schematically in Fig. XIII. As shown, current flows from supply mains 113 and 114 through conductors 115 and 116 to a disconnect switch 117. From the other side of the disconnect switch a conductor 118 is connected through a lead 119 to one side of the motor 65 which drives the slipping clutch, through a lead 120 to one side of the solenoid 76, through a lead 121 to one side of the field winding of the Selsyn receiver 106 and through a lead 122 to one side of the field winding of the Selsyn transmitter 107. Leads 123, 124 and 125 respectively connect the other sides of the Selsyn transmitter field winding, Selsyn receiver field winding and the motor 65 to a lead 126 which completes the circuit to the disconnect switch 117. Three leads 127 interconnect the armature winding of the two Selsyns 106 and 107. The other side of the solenoid 76 is connected through a lead 128, one pole 129 of a double pole double throw switch, a lead 130, contacts 131 of the cam operated switch 105, a lead 132, the other pole 133 of the double pole double throw switch and a lead 134 to the lead 126 which completes the circuit to the disconnect switch 117.

Thus, closing the disconnect switch 117 starts the motor 65 and energizes the Selsyns 106 and 107, and provides power so that the switch 105 may operate the solenoid 76 in accordance with conveyor belt movement as transmitted through the Selsyns 106 and 107 and the cam 104.

These circuits are all that are required when the device is operating as a continuous integrating weigher. When it is desired to weigh and totalize discrete items or loads and therefore use the photo-electric switch, current to operate the light source 108 and amplifier 112 is fed from the disconnect switch 117 through the lead 118, a lead 135, leads 136 and 137 to the light source 108 and amplifier 112 respectively, then through the leads 138 and 139 respectively, a lead 140, and the lead 126 to the other side of the disconnect switch 117. Leads 141 connect the photocell 110 to the amplifier 112. Other leads 142 connect the contacts of a relay in the amplifier 112 to terminals of the double pole double throw switch.

The amplifier 112 is of conventional design and includes a timer whereby each interruption of the light beam briefly closes the amplifier relay contacts.

In operation, when the double pole double throw switch substitutes the photo switch for the cam operated switch 105 in the circuit of the solenoid 76, each interruption of the light beam as an object crosses the scale results in an operation of the totalizer and the accumulated weight is indicated by the counter.

While the scale incorporating the invention has been described in connection with a conveyor belt it is also useful for totalizing the weight of cars or trucks successively placed thereon.

If a cycle counter be added to record the number of operations, the device may be used to determine the average indication of a condition responsive mechanism by dividing the integrated total by the number of operations resulting in that total.

Modifications may be desirable when adapting the device for various uses.

Having described by invention, I claim:

1. In a weighing scale, in combination, load counterbalancing and load indicating means, a spiral cam positioned by the load indicating means, a reciprocatory slide, a continuously running motor and slipping clutch for holding the slide against a stop and free of said cam, a solenoid for disengaging said clutch to allow said slide to move into contact with said cam, and means for totalizing the motion of said slide.

2. In a weighing scale, in combination, load counterbalancing and load indicating means, a spiral cam positioned by the load indicating means, a sliding member adapted to be reciprocated between said cam and a fixed stop, a motor and slipping clutch for holding said member against the fixed stop, a solenoid for disengaging said clutch, means responsive to loads on the scale for intermittently energizing said solenoid, and means for totalizing the travel of said member.

3. In a weighing scale, in combination, load counterbalancing and load indicating means, a member positioned by said load indicating means, a reciprocatory slide, electrically controlled means for releasing said slide to allow it to drop against said member, mechanical means for returning said slide to its normal position, a switch for operating the electrically controlled means, and means for totalizing the movement of the slide.

HALVOR O. HEM.

REFERENCES CITED

The following references are of record in the file of this patent:

UNITED STATES PATENTS

| Number | Name | Date |
|---|---|---|
| 763,143 | Boland | June 21, 1904 |
| 2,261,655 | Lowe | Nov. 4, 1941 |
| 2,285,719 | Jerome et al. | June 9, 1942 |
| Re. 15,854 | Martindale | June 3, 1924 |
| 2,264,370 | Harrison | Dec. 2, 1941 |
| 2,266,839 | Ackley | Dec. 23, 1941 |
| 2,330,606 | Moore | Sept. 23, 1943 |
| 2,093,151 | MacLean | Sept. 14, 1937 |
| 2,117,341 | MacLean | May 17, 1938 |
| 1,808,930 | Messiter | June 9, 1931 |
| 2,123,978 | Wagner | July 19, 1938 |
| 719,446 | Dyer | Feb. 3, 1903 |
| 1,744,232 | Lenton | Jan. 21, 1930 |
| 1,131,785 | McCormick | Mar. 16, 1915 |

FOREIGN PATENTS

| Number | Country | Date |
|---|---|---|
| 614,954 | Germany | June 22, 1935 |
| 586,614 | Germany | Oct. 24, 1933 |